(No Model.)

C. M. & C. E. KEMP.
PIPE TESTING MACHINE.

No. 602,289. Patented Apr. 12, 1898.

Witnesses:

Inventors
C. M. Kemp
C. E. Kemp
By J. Granville Meyers
Attorney

UNITED STATES PATENT OFFICE.

CLARENCE M. KEMP AND CHARLES E. KEMP, OF BALTIMORE, MARYLAND.

PIPE-TESTING MACHINE.

SPECIFICATION forming part of Letters Patent No. 602,289, dated April 12, 1898.

Application filed September 15, 1897. Serial No. 651,814. (No model.)

*To all whom it may concern:*

Be it known that we, CLARENCE M. KEMP and CHARLES E. KEMP, of the city of Baltimore and State of Maryland, have invented a new and Improved Pipe-Testing Apparatus, of which the following is a full, clear, and exact description.

Our invention relates to an apparatus for testing cast-iron pipes and other pipes to discover sand or blow holes or other defects in same; and it consists, primarily, of a simple, inexpensive, and quickly-applied apparatus for closing the ends of pipes, to whose interior some testing fluid is to be applied under pressure. The invention embraces also a ready means for applying said testing fluid, and the construction and arrangement of the various parts provide a novel apparatus, compact, cheaply constructed, easily applied, efficient, and durable.

Reference is to be had to the accompanying drawings, forming a part of this specification, in which the same letters of reference indicate the same or corresponding parts in both the figures.

Figure 1:
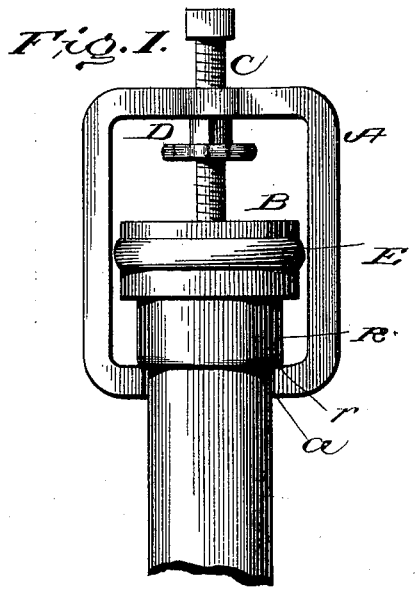
Figure 2:
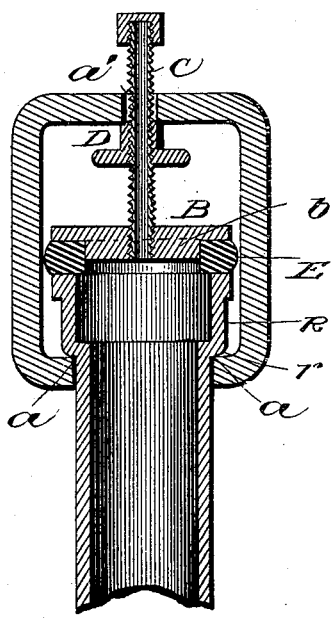

Figure 1 is a side elevation of the pipe-testing apparatus applied to the end of a cast-iron pipe and shows the ends of the yoke engaging the shoulder of the hub on the pipe. No more of the pipe being needed to illustrate the invention same is shown cut off at the ragged line terminating the view of the pipe. Fig. 2 is a detail longitudinal sectional view of Fig. 1.

The testing apparatus consists of a yoke A, circular plate B, in the center of which is fastened the threaded pipe C, provided with nut D, preferably toothed, and rubber washer E. The yoke A is U-shaped and has its ends provided with inward projections $a$, whereby the yoke secures a hold against the shoulder $r$ of the hub R on the pipe to be tested. The yoke is provided with a hole $a'$ in the center of its upper section, through which the threaded pipe C freely slips. The circular plate B has a circular boss $b$ on its lower side smaller in diameter than the upper portion of the plate B. A rubber washer or gasket E snugly fits against the edges of the boss $b$, and the outer diameter of the rubber washer comes even with the circumferential edge of the plate B. The threaded pipe C is secured to the plate B when the latter is cast upon it. By this method of fastening the pipe C is most securely fixed in the plate B and is likewise made central thereof. This central pipe performs two services—that of a bolt, whereby to cause compression of the rubber washer, and also a means to pass the testing fluid, which is water or compressed air or smoke, to the interior of the pipe to be tested. The pipe B is provided with a toothed nut D.

The operation of this testing apparatus is as follows: Same is set upon the end of the pipe, having a shoulder or hub. The toothed nut is revolved on the pipe, and the upper part of the nut presses against the yoke, thereby forcing the yoke upward and the pipe C downward. The pipe C, carrying the clamp-plate B and rubber washer E with it, compresses the latter tightly against the mouth of the pipe to be tested, and testing liquid or fluid can be passed through the pipe C, and the joint made by the washer will stand all requisite pressure without leaking.

This construction of testing apparatus provides a simple method and a very cheap and enduring apparatus. The rubber gasket when compressed has the tendency to bulge somewhat on its periphery, as shown in the drawings. The testing fluid under pressure will readily force its way through any sand-holes or splits, should there be such, in the pipe that is being subjected to the test. If the pipe to be tested has no hub, a hub or clamp-collar can be readily attached thereto, and this testing apparatus can be fastened thereto as readily as to a hub integral with the pipe.

The drawings show the pipe C provided at one end with a common pipe-cap. This cap is used merely to prevent the pipe C from slipping through the yoke A when the apparatus is not being used. When the fluid is to be passed through the threaded pipe C, the cap on the end of the same is removed. A common stop or valve can be readily substituted for the cap, if desired.

Having thus fully described our invention, we claim as new and desire to secure by Letters Patent—

1. In a pipe-testing apparatus, the combination with a yoke-frame arranged to engage a collar or projection on a pipe, of a plate adapted to cover the end of the pipe and provided with a rubber gasket upon one side and a threaded tube projecting from the opposite side, said tube passing freely through an opening in the yoke-frame, and a nut tapped upon the said threaded tube, as and for the purpose specified.

2. In a pipe-testing apparatus, the combination with a yoke-frame arranged to engage a collar or projection on a pipe, of a plate adapted to cover the end of the pipe and provided with a rubber gasket upon one side, an externally-threaded tube rigidly secured to the opposite side of said plate and having its free end extending loosely through an opening in the yoke-frame, a nut tapped upon said threaded tube for the purpose specified, and a hand-wheel carried by the nut.

In testimony whereof we affix our signatures in the presence of two witnesses.

CLARENCE M. KEMP.
CHARLES E. KEMP.

Witnesses:
W. ROBY PURNELL,
JOHN S. COLE.